United States Patent

Anderson

[15] 3,645,154
[45] Feb. 29, 1972

[54] CHUCK FOR LATHE, GRINDING OR MILLING MACHINE

[72] Inventor: Dennis J. Anderson, Ilion, N.Y.
[73] Assignee: Remington Arms Company, Inc., Remington Arms Company, Inc., Bridgeport, Conn.
[22] Filed: Feb. 24, 1970
[21] Appl. No.: 13,535

[52] U.S. Cl. ............................................82/40, 51/237 R
[51] Int. Cl. ..........................................................B23b 33/00
[58] Field of Search............................82/40; 51/236, 237 R

[56] References Cited

UNITED STATES PATENTS

| | | | |
|---|---|---|---|
| 2,909,955 | 10/1959 | Williams | 82/40 |
| 3,266,349 | 8/1966 | Lane | 82/40 |

FOREIGN PATENTS OR APPLICATIONS

| | | | |
|---|---|---|---|
| 653,745 | 12/1937 | Germany | 82/40 |
| 177,173 | 8/1961 | Sweden | 82/40 |

*Primary Examiner*—Leonidas Vlachos
*Attorney*—John H. Lewis, Jr. and Nicholas Skovran

[57] ABSTRACT

This invention relates to a mechanical chuck for a lathe, grinding machine, or milling machine which will automatically adjust the gripping jaws to provide equal support for the workpiece. The chuck is of the driving center variety, wherein the workpiece is centered and end-gripped. The chuck is designed to eliminate the disadvantages concomitant with hydraulic chucks, which tend to leak, jam, and need periodic servicing. A self-lubricating feature is also provided.

7 Claims, 7 Drawing Figures

PATENTED FEB 29 1972

Inventor:
Dennis J. Anderson by John H. Lewis Jr.
Nicholas Skovran
Attorneys

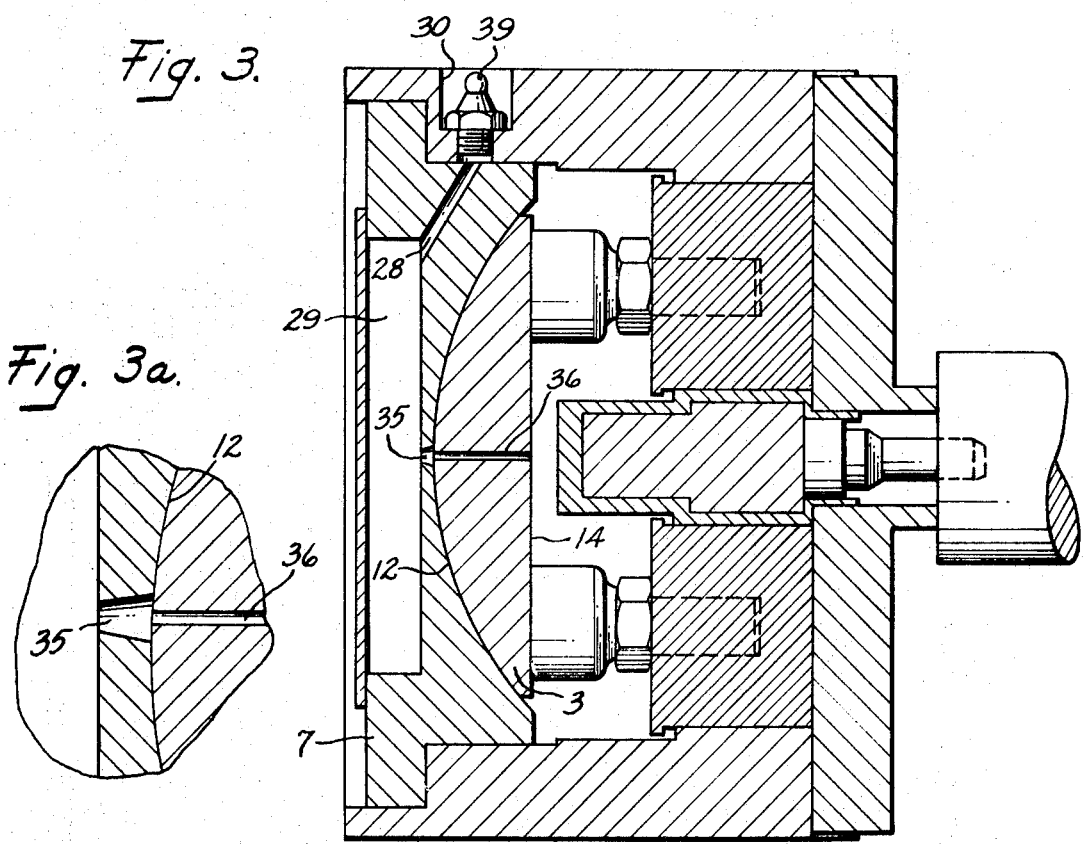
Fig. 3.
Fig. 3a.
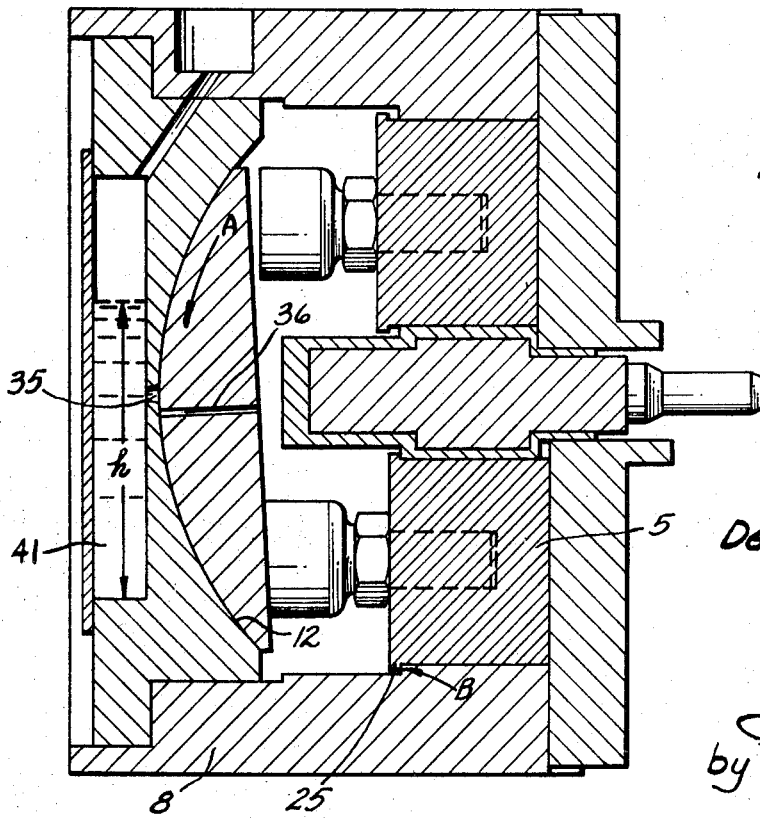
Fig. 4.
Inventor:
Dennis J. Anderson
John H. Lewis Jr.
by Nicholas Skovran
Attorneys Inventor:
Dennis J. Anderson John H. Lewis Jr.
by Nicholas Skovran
Attorneys

CHUCK FOR LATHE, GRINDING OR MILLING MACHINE

The invention pertains to a chuck for a lathe, grinding machine, or milling machine and more particularly to an adjustable chuck of the driving center variety for end-gripping a workpiece.

The driving center chuck provides many advantages over the prior methods of constraining machining materials. For example, a shaft which is end-gripped by a driving centered chuck, can be completely machined from one end to the other. This eliminates additional machining operations.

Correction was previously required for those end areas which were formerly inaccessible to the machining tool or which had to be remachined for having been marred by the clamping teeth of the chuck.

Material savings and reduced setup time are also realized by the new method.

With the many advantages expressed by end-gripping, there are also many problems. Precise force alignment has to be maintained amongst the several gripping jaws, since the slightest maladjustment can cause the workpiece to slip while spinning. This is often caused by an out-of-square condition on the gripped end of the workpiece. This slippage cannot be tolerated because the workpiece can then fly out of the lathe, causing damage and injury. Also, unequal forces on the gripping jaws causes bending in slender shafts (gun barrels), making machining very difficult.

As a result of the aforementioned requirement, the jaws of the chuck are made to equalize the end forces between them. The common method of accomplishing this equalization is to have the individual jaws transmit their end forces to a fluid medium. This medium distributes the forces back to the jaws, so that each gripping member can be in equal contact with the workpiece (Pascal's theory).

The obvious disadvantage of employing hydraulics, however, is that the fluid medium has a tendency to leak or become contaminated. Thus, it is very common for these chucks to jam, or otherwise become inoperative.

The present invention is for a chuck which will accomplish the various objectives set forth for driving center devices, but which will eliminate the problems concomitant thereto.

The present system is predicated upon an exclusively mechanical means of equalizing the jaws. As such, the problems of leakage and contamination of the liquid medium are nonexistent.

Several other attempts have been made to provide a mechanical equalization or adjustment feature in chucks. Reference is hereby made to patents issued to Sloan, U.S. Pat. Nos. 2,698,185, issued Dec. 28, 1954; and 2,524,485, issued Oct. 3, 1950.

The present chuck has many distinct differences and advantages over the Sloan chucks.

In the first instance, the Sloan devices do not represent end-gripping chucks as does the subject invention.

In the second place, the invention tries to distribute the forces over a wide surface area (spherical cap) so that adjustment and alignment approaches its truest potential. The small spherical ball of the Sloan devices tends to create precise alignment, and tolerance problems. By spreading the forces over a larger sliding surface, the present chuck eliminates costly precision parts. In addition, any inconsistencies in the surface of the spherical cap and its mating depression will wear themselves into a truer alignment with use, while this does not appear to be the case with the ball of Sloan.

The U.S. Pat. No. 2,698,185 has many more moving parts than the present system, which obviously makes for a more costly and complicated structure. The U.S. Pat. No. 2,524,485 patent shows a high-friction-type connecting link between the jaws and the universal ball centering means. The present chuck is simple in operation compared to the Sloan devices, and attempts to reduce friction to the minimum so that equalization of the jaws will be smooth and trouble-free. The reduction of friction is highly essential in order to produce true equalization of the end forces. To this end, this invention contemplates using frictionless materials on all sliding, mating or moving surfaces and/or lubricating or coating said surfaces with frictionless materials.

It is to be noted, however, that the increase in mating surface area in the present device does not necessarily increase the frictional forces. The frictional force $F_{FR}$, on the sliding surfaces is generally given by the formula:

$$F_{FR} = \mu N$$

where:

$N$ is the normal force exerted on the mating surface; and $\mu$ is the coefficient of sliding friction between the mating surfaces.

Thus, it is evident from the above formula, that surface area is not a parameter that influences the frictional effects of the mating parts.

Reference is also made to the patent issued to Carmi et al., U.S. Pat. No. 3,158,391, issued Nov. 24, 1964. This patent discloses annular spherical mating parts not unlike the present system. It is to be noted, however, that Carmi et al. neither teaches nor shows how this device may be employed for application in the chuck art, nor does he explain how to align three separate contact members (jaws).

It is an object of the present invention to provide a driving center chuck for end-gripping a workpiece, which will equalize the end forces upon the gripping jaws by mechanical means.

It is another object of this invention to provide a driving center chuck which will be devoid of the problems usually associated with chucks using hydraulic means to equalize the jaws.

It is a contemplation of this invention to provide a mechanical chuck which will freely equalize the forces amongst the gripping jaws by employing frictionless materials in strategic areas of mechanical alignment and connection.

It is still another object of this invention to provide a chuck which is self-lubricating.

It is a further object of this invention to provide a chuck of the driving center variety which is reliable in operation, requires little if any maintenance, and is inexpensive to manufacture.

These and other objects of the invention will present themselves and become more evident from an understanding of the subsequent detailed description and the accompanying drawings in which:

FIG. 3 illustrates a sectional side view of the chuck embodying an automatic lubricating reservoir;

FIG. 3a is a blowup view of a particular feature of FIG. 3;

FIG. 4 shows the chuck of FIG. 3 containing lubricant while at rest;

Figure 1:
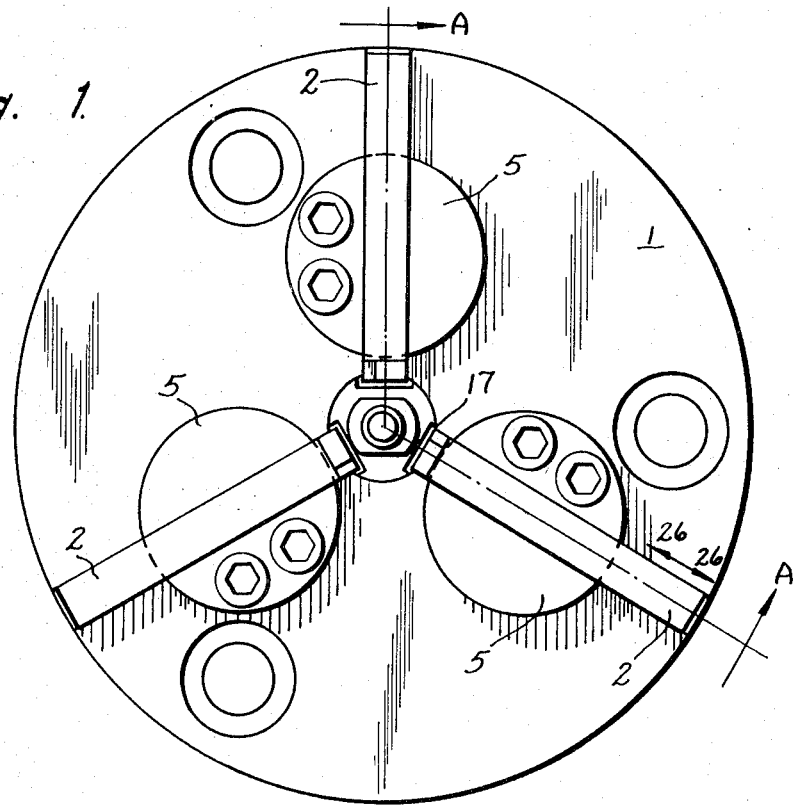
FIG. 1 shows a front view of the chuck of this invention.

Generally speaking, the invention is for an adjustable chuck of the driving center variety for end-gripping a workpiece. There are several novel features in the chuck, one being an adjustment means and another comprising a self-lubricating system.

The chuck comprises a housing having its axis of rotation extending from a front face portion to a rear portion thereof. A baseplate is rigidly secured within the housing. The surface of the baseplate has an annular spherical depression. A movable member makes slidable mating contact with the baseplate by means of an annular spherical protuberance which has a radius of protrusion like that of the radius of depression in the baseplate, so that both protuberance and depression are in substantial surface conformity with each other. A plurality of jaws for the purpose of gripping the workpiece are disposed upon the front face portion of the housing angularly spaced thereabout in substantially equal array. The jaws are individually connected to the movable member and are free to coaxially move with respect to the rotational axis of the housing.

When a coaxial force is applied by the workpiece to any one or more of the jaws, the jaws will transmit the force to the movable member causing it to slide upon the baseplate and thereby adjust the jaws to a position of substantially equal support for the workpiece.

The transmission of the workpiece end forces is further accomplished by a plurality of tiltable toggle links each of which contains a ball-socket and linking ball assembly. The ball-socket portion of each assembly is connected to the slidable member, and the linking balls are individually connected to one of the gripping jaws. When a force is exerted on any one or more of the jaws, it is communicated through the respective ball and ball-socket assemblies to the slidable member, causing it to move in adjustive response to the force.

The mating surfaces of the protuberance and depression should be made as frictionless as possible to facilitate the adjustment of these parts under light loads. Also, the toggle assemblies should be as frictionless as possible for similar reasons. The reduction of the friction can be accomplished in several ways such as:

a. making all moving or mating surfaces of frictionless materials or materials which can be impregnated with friction relieving substances such as graphites or oils, etc.

b. coating the moving metallic parts with coatings of frictionless substances such as teflon or other solid or dry film lubricants, and c. keeping all parts well lubricated by means of internal oil reservoirs, wherein the oil is fed to the necessary parts under centrifugal force and/or by capillary action.

In conformity with the aforementioned objectives, an automatic or self-lubricating feature is provided for the chuck.

Self-lubrication is considered by the inventor to be an innovation in the mechanical chuck art. Although the present invention shows a particular means of automatically lubricating the mechanical operating parts of the chuck, other methods or means may be fashioned to achieve this purpose that are not inconsistent with the spirit and scope of this invention.

Generally speaking, the automatic lubricating means comprises a reservoir of lubricant internally disposed within the chuck housing.

The reservoir has a metering aperture to periodically supply a given amount of the lubricant to the mechanical parts of the chuck. Distribution of the lubricant is achieved by centrifugal force, when the chuck is put under rotation. Distribution to remote parts of the mechanical system is also achieved by providing small holes communicating with the reservoir which feed the lubricant from the reservoir to the desired parts by capillary action.

Either centrifugal force or capillary action can be used or a combination of the two for the above purposes.

Now referring to FIG. 1, a front view of the chuck of this invention is shown. The face of the chuck is given as 1. Three gripping jaws are disposed upon the face of the housing in equal array about the axis of rotation R (see FIG. 2). A typical gripping jaw is represented as 2, and each jaw has a biting tooth 17 for end-gripping the workpiece. The jaws rest within the jaw holders 5, and can be adjusted for different workpiece sizes by moving the jaws toward or away from the axes of rotation as shown by arrows 26. When the proper setting is achieved, the jaws are locked into place within the jaw holders (not shown).

Figure 2:
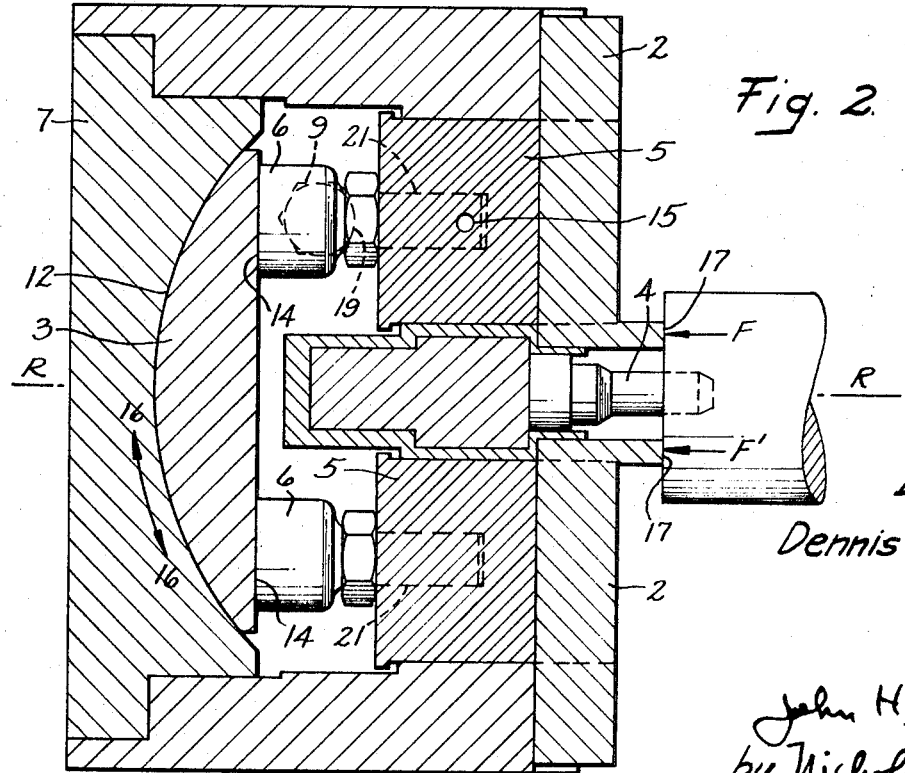
FIG. 2 depicts a side view of the chuck, but through section lines A—A of FIG. 1.

Now referring to FIG. 2, a sectional side view of the chuck is shown as taken along lines A—A of FIG. 1.

The housing of the chuck is given as 8. A baseplate 7 is affixed to the housing at the rear thereof. The baseplate has an annular spherical depression with its concave surface facing the front of the chuck. Resting within the depression is a cap 3 (an annular spherical protuberance) having a radius of convexity similar to the radius of concavity of the depression so that both parts conform or otherwise mate with each other as depicted by surface 12.

The cap 3 has a flat surface 14. Three toggle assemblies 6 are in contact with surface 14. The toggle assemblies each have a ball-socket 9 in which a toggle ball 19 rests. Each assembly is individually connected to a gripping jaw 2 by means of a link 21 which is pinned at 15 to the jaw holder 5.

In operation, the chuck center 4 contacts the workpiece (not shown). This action is independent of the gripping teeth, which is not always the case in other driving centers. The center 4 is biased into engagement by a spring (not shown). The workpiece then contacts the teeth 17 of the gripping jaws 2. FIG. 2 shows two different forces, F and F', respectively, exerted by the workpiece and acting upon the teeth. If these forces are not in balance, i.e., not equal in magnitude, then the system will adjust the positions of the gripping jaws so that they each equally support the workpiece. This is accomplished in the following manner:

The jaws 2 are free to move coaxially with respect to the rotational axis R, so that any force or forces exerted by the workpiece upon the teeth 17 will cause the jaws 2, and consequently the jaw holders 5, to move.

These forces are subsequently exerted upon links 21 which are pinned to the jaw holders 5 at point 15. These forces are transmitted to toggle assemblies 6 which are free to tilt. This tilting action will exert a force upon surface 14 of cap 3, causing the cap to slide upon baseplate 7 as is generally depicted by arrows 16. The cap 3 will be displaced in the direction of the least force, which is that direction in which a gripping jaw is not bearing its share of the workpiece load.

In so shifting, the cap will exert a force back upon the linkage of the gripping jaw bearing the lesser force. This will cause the jaw to reseat itself with respect to the workpiece and will result in adjusting the jaws to a position of equal support of the end gripping forces.

Now referring to FIG. 3, an automatic lubricating reservoir is shown for the chuck. The reservoir 29 is filled by means of a hydraulic fitting 39 which is recessed in counterbore 30. The oil (lubricant) flows through line 28 into reservoir 29 which forms part of baseplate 7. A small tapered metering hole 35 communicates with the reservoir (see FIG. 3A). This metering hole will entrap a small given amount of oil which will flow along surface 12 under centrifugal force (when the chuck is rotating). The oil will also flow into capillary hole 36 when this hole is in proper alignment with the metering hole 35 as shown.

In practice, several of these small holes (36) may be provided to suck the oil from hole 35, when the cap 3 is in different positions with respect to the baseplate 7. Continuous flow from the metering hole 35 is blocked, however, when the chuck is at rest (not rotating), as is observable with reference to FIG. 4. The height of the lubricant 41 is depicted by "h." When the chuck is in this position oil will flow into hole 35, but will be blocked from flowing into hole 36. Neither will the lubricant flow along edge 12, because the chuck is not rotating. The oil is prevented from leaving the tapered metering hole, because the cap has slumped to a position blocking hole 35 as is shown by arrow A. Slumping too far out of alignment, however, is prevented by contact of shoulder 25 of the jaw holder 5 with that of the flange B of the housing 8.

Figure 5:
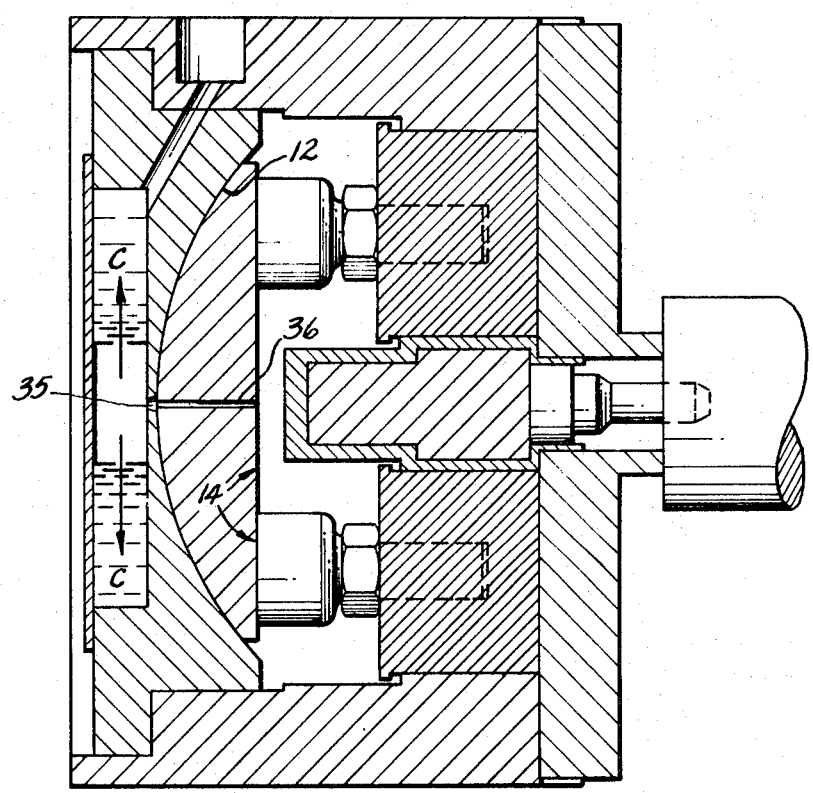
FIG. 5 depicts the chuck of FIG. 3 containing lubricant while rotating.

When the chuck is rotating as is illustrated in FIG. 5, oil will not continuously flow out of the hole 35, because the metering hole is not in contact with its reservoir supply. The lubricant in the reservoir is forced outward under centrifugal force as is shown by arrows C, leaving no lubricant in contact with hole 35.

Lubricant is trapped, however, in hole 35 from the previous instance when the chuck was at rest (see FIG. 4). This oil is now distributed to surfaces 12 and 14 under the action of centrifugal force and capillary action.

Thus, it is seen that the aforementioned arrangement distributes a given amount of oil during its operation, and is self-lubricating in the truest sense of the word. It must be noted that the size of the holes 35 and 36 will determine the quantity of the lubricant fed to the system. It must also be noted that the mating surfaces at 12 are also critical in the proper distribution of oil.

Of course, many modifications may be made in the above system—for example, each toggle may have its own reservoir built into the assembly, with its individual metering hole. Several interconnecting reservoirs can be employed within the housing to furnish lubricant to various parts of the mechanical mechanism.

Figure 6:
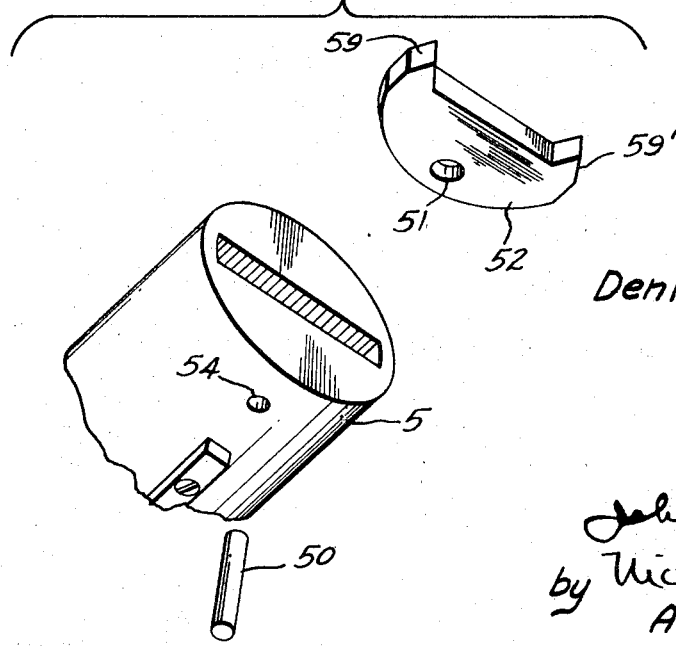
FIG. 6 illustrates an alternate embodiment for the jaws of the chuck.

FIG. 6 depicts an alternate jaw arrangement for the chuck. The jaw holder 5 is provided with a slot to accommodate the gripping jaw 52. The gripping jaw has two teeth shown as 59 and 59', respectively. The jaw 52 is anchored to the jaw holder 5 by means of a pin 50 which fits the hole 54 of the jaw holder, and also fits through hole 51 of the gripping jaw. The pin 50 is keyed (not shown) to prevent rotation.

Obviously, many modifications and variations may be made in this invention which are apparent to those skilled in the art. Such changes are considered to be within the spirit and scope of the invention as depicted by the appended claims.

What is claimed is:

1. An adjustable chuck of the driving center variety for end-gripping a workpiece comprising:
    a housing having its axis of rotation extending from a front face portion to a rear portion thereof;
    a baseplate rigidly disposed within the housing and having an annular spherical concave depression in a surface of said plate;
    a movable member in slidable mating contact with the baseplate, said member having an annular spherical convex protuberance with a protrusive radius of like convexity as that of the radius of concavity of said baseplate, wherein said protuberance is in substantial surface conformity with the depression;
    a plurality of jaws for gripping a workpiece, said jaws disposed upon the front face portion of the housing angularly spaced about the front face portion in substantially equal array, said jaws individually connected to the movable member and free to coaxially move with respect to the rotational axis of said housing, whereby any force, coaxial in direction to the rotational axis of the housing, which is exerted by the workpiece upon any one or more of the jaws, will be transmitted by the jaws to the movable member causing it to slide upon said baseplate and thereby adjust the jaws to a position of substantially equal support for said workpiece; and a plurality of tiltable toggle links each containing a ball-socket and linking ball assembly, respectively, the ball-socket portion of each assembly being connected to said slidable member, and each linking ball being connected to an individual gripping jaw, respectively, whereby a coaxial force upon any one or more of the jaws will be communicated through the respective ball and ball-socket assemblies to the slidable member and cause said member to move in adjustive response to the force.

2. The adjustable chuck of claim 1, wherein the mating surfaces of the baseplate depression and the protuberance of the movable member are substantially coated with a friction reducing substance whereby the baseplate and movable member are rendered more favorably movable with respect to each other.

3. The adjustable chuck of claim 1, wherein the baseplate and movable member are composed of a substantially frictionless material, whereby they are rendered more favorably movable with respect to each other.

4. The adjustable chuck of claim 1, wherein there are three jaws for gripping the workpiece.

5. The adjustable chuck of claim 4, wherein there are two teeth on each gripping jaw, respectively.

6. The adjustable chuck of claim 1, wherein the mating surfaces of the ball and ball-socket assemblies are substantially coated with a friction reducing substance so as to render the toggle more favorably tiltable.

7. The adjustable chuck of claim 1, wherein the ball and ball-socket assemblies of said toggles are composed of a substantially frictionless material, hereby the toggle is rendered more favorably tiltable.

* * * * *